US012734908B2

(12) United States Patent
Choi

(10) Patent No.: US 12,734,908 B2
(45) Date of Patent: Sep. 15, 2026

(54) STACKABLE BATTERY

(71) Applicants: Hyundai Motor Company, Seoul (KR); Kia Corporation, Seoul (KR)

(72) Inventor: Myung Sic Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 363 days.

(21) Appl. No.: 18/496,220

(22) Filed: Oct. 27, 2023

(65) Prior Publication Data

US 2024/0383343 A1 Nov. 21, 2024

(30) Foreign Application Priority Data

May 15, 2023 (KR) ........................ 10-2023-0062517

(51) Int. Cl.

*B60L 50/64* (2019.01)
*B60L 50/60* (2019.01)
*H01M 50/249* (2021.01)

(52) U.S. Cl.

CPC ............... *B60L 50/64* (2019.02); *B60L 50/66* (2019.02); *H01M 50/249* (2021.01); *B60Y 2200/91* (2013.01); *H01M 2220/20* (2013.01)

(58) Field of Classification Search

CPC ...... B60L 50/64; B60L 50/66; H01M 50/249; H01M 50/258; H01M 50/269
See application file for complete search history.

(56) References Cited

U.S. PATENT DOCUMENTS

| | | | | |
|---|---|---|---|---|
| 8,669,000 | B2 * | 3/2014 | Yoon | H01M 10/0481 429/99 |
| 9,647,250 | B2 * | 5/2017 | Muck | B60K 1/04 |
| 11,289,760 | B2 * | 3/2022 | Yu | H01M 50/242 |
| 11,588,199 | B2 * | 2/2023 | Ramadan | B60L 50/64 |
| 2025/0219228 | A1 * | 7/2025 | Häupler | H01M 10/658 |

FOREIGN PATENT DOCUMENTS

| | | |
|---|---|---|
| KR | 20200046580 A | 5/2020 |

* cited by examiner

*Primary Examiner* — James A Shriver, II
(74) *Attorney, Agent, or Firm* — Slater Matsil, LLP

(57) ABSTRACT

An embodiment stackable battery includes a plurality of battery cases stacked in a height direction of a vehicle, each of the battery cases including a side member on an outer side thereof extending in a length direction of the vehicle and a mounting portion including a plurality of hollows penetrating vertically in the side member, wherein the mounting portion of the bottommost battery case is configured to be engaged to a roof of the vehicle by penetration of first engaging members into first hollows of the plurality of hollows.

20 Claims, 5 Drawing Sheets

STACKABLE BATTERY

CROSS-REFERENCE TO RELATED APPLICATIONS

This application claims the benefit of Korean Patent Application No. 10-2023-0062517, filed on May 15, 2023, which application is hereby incorporated herein by this reference.

TECHNICAL FIELD

The present invention relates to a stackable battery.

BACKGROUND

Recently, as carbon emission issues due to the use of petroleum energy have emerged as a major reason for climate change, research on technologies for eco-friendly energy use that reduces carbon emission is in progress. In particular, in the field of automobiles, automobiles using hydrogen fuel cells using hydrogen fuel and lithium secondary batteries using lithium ions as power sources are attracting great attention.

Meanwhile, as a driver may drive an electric automobile using a lithium secondary battery as a power source longer for a longer drivable distance with a single charge, the driver may feel psychological comfort and options for long-distance driving and short-distance driving and wide options for long-distance driving may be provided.

To increase the one-trip length of an electric vehicle, various techniques such as changing a material of a secondary battery, increasing the performance of a motor, and reducing the weight of the vehicle are being considered.

Meanwhile, for some vehicles, a battery case including a battery module is mounted on a roof of a vehicle. In such a vehicle, a separate carrier is installed on the roof to mount the battery case on the roof of the vehicle.

As a frame layout of the carrier installed on the roof of the vehicle is formed relatively larger than the battery case, an unnecessary space may be formed, and for a weight of the carrier being about 300 kg, by removing the carrier, the size of the vehicle may become compact and fuel economy may also be improved.

The matters described as background information are merely for improving the understanding of the background of embodiments of the present invention and should not be accepted as acknowledging that they correspond to the prior art known to those of ordinary skill in the art.

SUMMARY

The present invention relates to a stackable battery. Particular embodiments relate to a stackable battery which is installed on a roof of a vehicle and is stackable.

Embodiments of the present invention can solve problems in the art and aim to reduce a weight of a vehicle, achieve a compact size, and improve fuel economy of the vehicle by removing a carrier required for mounting a battery on a roof of the vehicle. Embodiments of the present invention also provide a stackable battery in which a battery capacity may be improved by vertically stacking a battery case.

According to embodiments of the present invention, a stackable battery includes a plurality of battery cases, in which a side member is formed on an outer side thereof to extend in a length direction of the vehicle, a mounting portion including a plurality of hollows penetrating vertically is formed in the side member, the mounting portion is engaged to a roof of the vehicle by penetration of an engaging member into the hole, and the plurality of battery cases are stacked in a height direction of the vehicle.

An engaging member having a different length may be inserted into an adjacent hollow formed in the mounting portion.

A rear member extending in a width direction of the vehicle may be formed at a front side or a rear side of the battery case, and the mounting portion having the plurality of hollows formed therein may be formed in the rear member.

The engaging member may include a first engaging member having a relatively short length and a second engaging member having a relatively long length.

A seating surface on which an upper end surface of the engaging member is seated may be formed in an inner lower portion of the mounting portion.

The plurality of battery cases may include a first battery case positioned in a relatively lower portion and a second battery case positioned in a relatively upper portion.

The engaging member may include a first engaging member having a relatively short length and a second engaging member having a relatively long length.

After the first battery case is engaged to the roof of the vehicle, the second battery case may be stacked on the first battery case and the second battery case may be engaged to the roof of the vehicle.

The first engaging member and the second engaging member may be inserted crosswise into the hollow formed in the mounting portion.

With the stackable battery according to embodiments of the present invention, by removing the carrier installed on the roof of the vehicle, the fuel economy of the vehicle may be improved and the battery case may be vertically stacked to increase the battery capacity, thereby increasing a drivable distance with a single charge.

DETAILED DESCRIPTION OF ILLUSTRATIVE EMBODIMENTS

Figure 1:
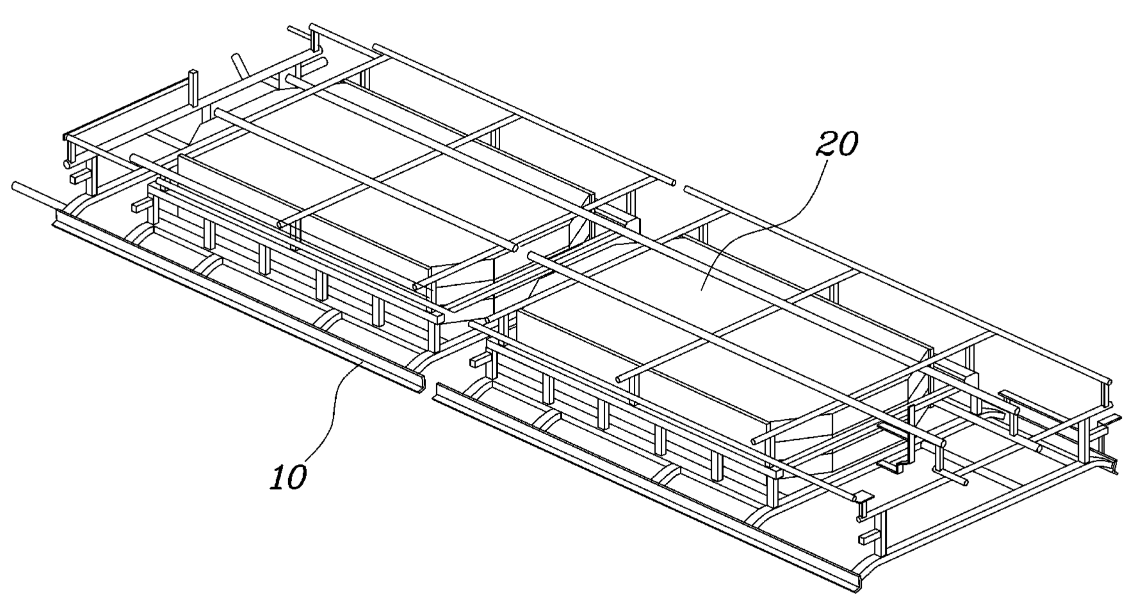
FIG. 1 shows a battery case mounted on a roof of a vehicle and a carrier for mounting the battery case on the roof of the vehicle.

Hereinafter, embodiments disclosed herein will be described in detail with reference to the accompanying drawings, and regardless of figure symbols, the same component or similar components will be given the same reference numeral and a redundant description will not be provided.

When an embodiment disclosed herein is described, a detailed description of related well-known techniques will be omitted if it obscures the subject matter of the embodiments disclosed herein. In addition, the accompanying drawings are only for easy understanding of the embodiments disclosed in the present specification, and it should be understood that the technical spirit disclosed herein is not limited by the accompanying drawings and all changes, equivalents, and substitutes included in the spirit and scope of the present invention are included.

Although ordinal numbers such as "first", "second", and so forth will be used to describe various components of embodiments of the present invention, those components are not limited by the terms. These terms may be used for the purpose of distinguishing one component from another component.

Singular forms include plural forms unless apparently indicated otherwise contextually.

It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

When a component is referred to as being "connected" or "coupled" to or by any other component, it should be understood that the component may be directly connected or coupled by the other component, but another new component may also be interposed between them. Contrarily, when a component is referred to as being "directly connected" or "directly coupled" to or by any other component, it should be understood that there is no component between the component and the other component.

Figure 2:
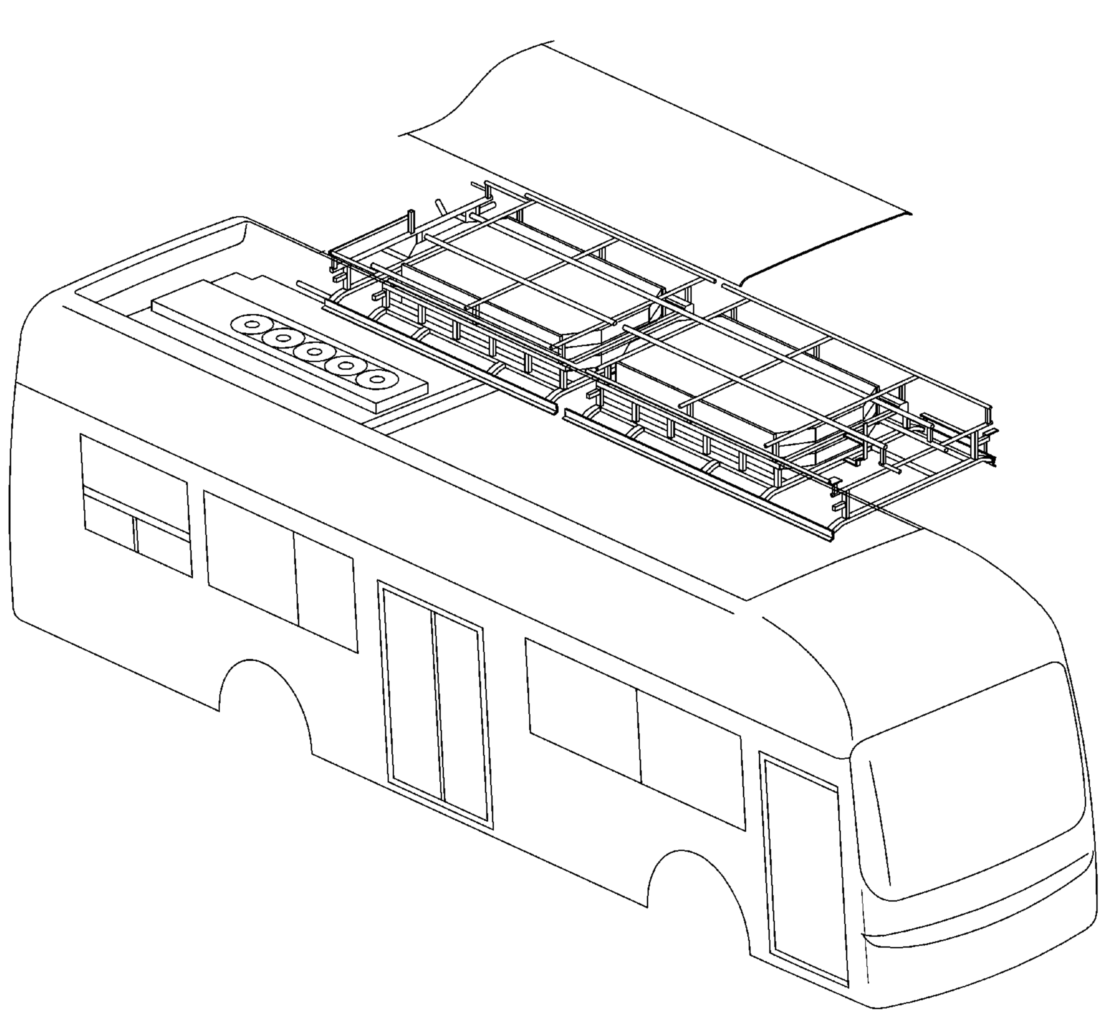
FIG. 2 shows a state of a battery case and a carrier being coupled to a roof of a vehicle.

FIG. 1 shows a battery case mounted on a roof of a vehicle and a carrier for mounting the battery case on the roof of the vehicle, and FIG. 2 shows a state of the battery case and the carrier being coupled to the roof of the vehicle.

A battery mounted on an electric vehicle is generally mounted under the vehicle for stability of driving of the vehicle. However, a technique for mounting the battery on the roof of the vehicle has been studied through weight reduction of the battery, etc., and when the battery of the vehicle is mounted on the roof, it is possible to increase the usability of the internal space of the vehicle and rapidly secure the battery capacity through battery stacking.

In particular, in a high-ceiling vehicle such as a bus transporting passengers, a space for mounting a battery on the roof of the vehicle is easy to provide. Due to a longer length of the bus than a general car, a plurality of batteries are easy to arrange.

Meanwhile, to mount a battery on a roof of a vehicle such as a general electric car or a bus, in order to secure rigidity with respect to a battery weight and mount a plurality of batteries 20 in a length direction of the vehicle, a separate structure such as a carrier 10 is required.

The carrier 10 has a weight of about 300 kg, and the overall weight of the vehicle may be reduced by removing the carrier 10, thereby improving fuel economy of the vehicle, and when the carrier 10 is removed, the battery 20 is directly mounted on the roof of the vehicle, and a stackable structure of the battery 20 is possible, and thus the capacity of the battery 20 may be dramatically secured.

Thus, there has been conducted research on a stackable battery from which the carrier 10 is removed.

Figure 3:
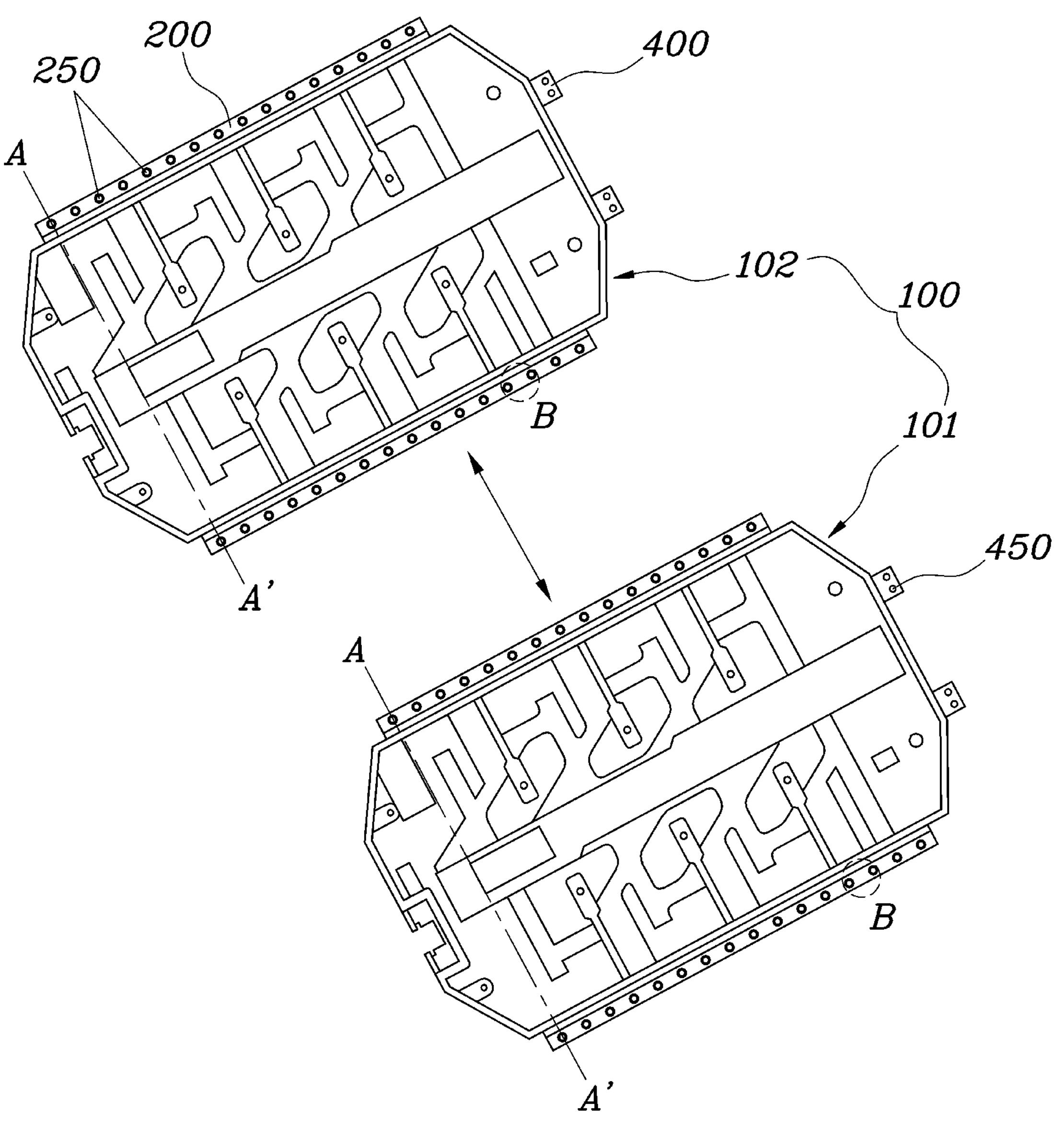
FIG. 3 is an exploded view of a stackable battery according to an embodiment of the present disclosure.

FIG. 3 is an exploded view of a stackable battery according to an embodiment of the present disclosure.

A battery case 100 of a stackable battery according to embodiments of the present invention may include a side member 200 formed on an outer side thereof in the length direction of the vehicle. A mounting portion 250 is formed on the side member 200 and is directly engaged to the roof of the vehicle. More specifically, a plurality of hollows penetrating vertically may be formed in the mounting portion 250. An engaging member 300 such as a bolt may be engaged to the hollow to directly engage the mounting portion 250 to the roof of the vehicle.

As such, by directly engaging the battery case 100 to the roof of the vehicle, a conventionally used carrier structure may be removed, thereby reducing the weight of the vehicle and thus increasing fuel economy of the vehicle.

The battery case 100 may be stacked vertically. The side member 200 extending in the length direction of the vehicle may be formed on the outer side of the battery case 100, a hollow may be formed in the side member 200, and the engaging member 300 may be engaged to the hollow, thereby engaging the battery case 100 stacked vertically to the roof of the vehicle.

Figure 4:
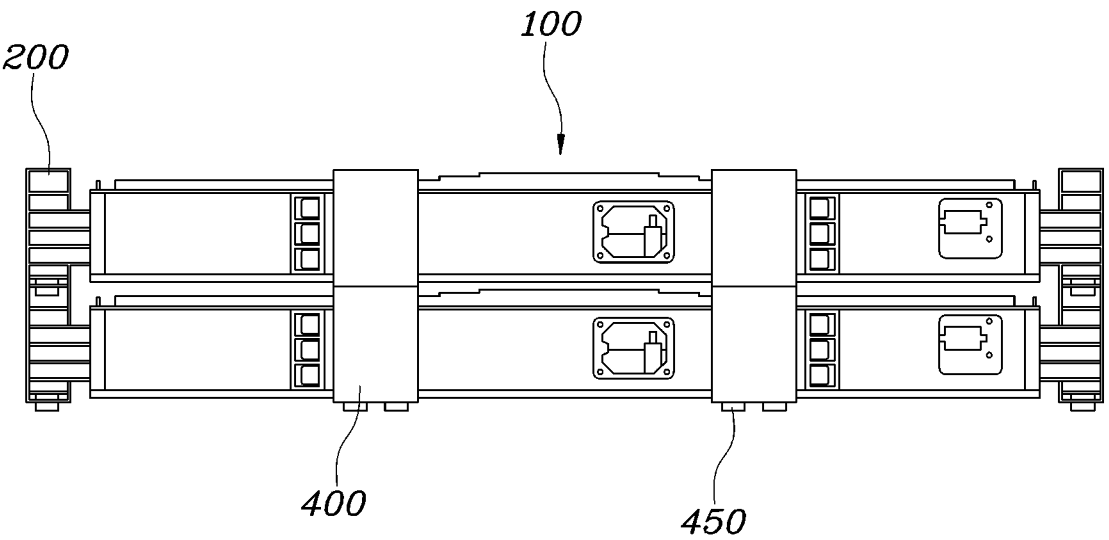
FIG. 4 shows a cross-section of a stackable battery stacked in two stages along line A-A' in FIG. 3.
Figure 5:
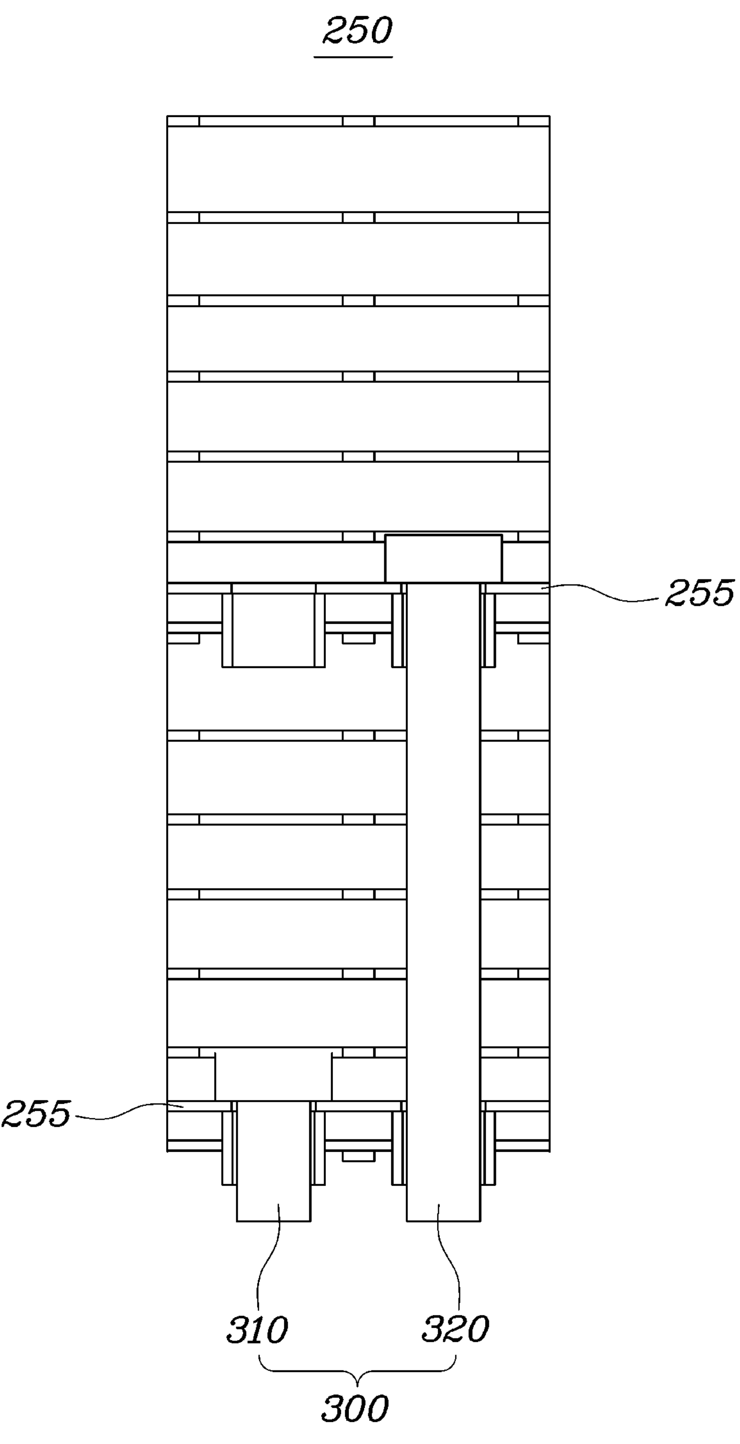
FIG. 5 shows a cross-section of a partial mounting portion B formed in a side member of FIG. 3.

FIG. 4 shows a cross-section of a stackable battery stacked in two stages along line A-A' in FIG. 3, and FIG. 5 shows a cross-section of a partial mounting portion B formed in a side member.

The stackable battery according to an embodiment of the present invention may include a first battery case 101 positioned in a relatively lower portion and a second battery case 102 positioned in a relatively upper portion, and for convenience of description, embodiments of the present invention will be described based on a stackable battery in which two battery cases 100 are stacked.

Stacking of the battery case 100 may be performed in a process described below. The mounting portion 250 of the first battery case 101 and the roof of the vehicle may be engaged through an engaging member, such that the first battery case 101 is coupled to the roof of the vehicle. In this case, the engaging member 300 may be inserted into some of the hollows formed in the mounting portion 250 of the first battery case 101 to couple the first battery case 101 to the roof of the vehicle. That is, some hollows to which the engaging member 300 is not engaged may be used for deposition of the second battery case 102 and coupling to the roof of the vehicle.

Thereafter, the second battery case 102 may be stacked to overlap the top of the first battery case 101, such that in this case, the side member 200 and the mounting portion 250 are substantially matched. The mounting portion 250 of the second battery case 102 and the roof of the vehicle may be engaged through the engaging member 300, such that the second battery case 102 in a state of being stacked on the first battery case 101 is coupled to the roof of the vehicle. In this case, the engaging member 300 may be inserted into a hollow of the mounting portion 250 of the second battery case 102, which overlaps a hollow into which the engaging member 300 is not inserted among the hollows of the mounting portion 250 of the first battery case 101.

A stackable battery with a capacity increased by stacking of the battery case 100 may be provided, and a total of four batteries may be provided by stacking the batteries arranged in two rows in a vehicle such as a conventional bus in two stages, and thus an electric vehicle using the stackable battery according to embodiments of the present invention may have a dramatically increased driving distance.

Meanwhile, the engaging member 300 may be inserted into the plurality of hollows formed in the mounting portion 250 to couple the battery case 100 to the roof of the vehicle. In this case, the engaging member 300 having a different length may be inserted into an adjacent hollow.

More specifically, the plurality of hollows may be formed in the mounting portion 250 of one battery case 100, and the engaging members 300 may be inserted into all of the hollows, but the first battery case 101 positioned in a lower portion may be first coupled to the roof of the vehicle. Thereafter, as the second battery case 102 is stacked on the first battery case 101 positioned in the lower portion so as to be coupled to the roof of the vehicle, when the engaging member 300 is inserted into one hollow in coupling of the first battery case 101, the engaging member 300 may be skipped without being inserted into an adjacent hollow and may be inserted into the next hollow to couple the first battery case 101 to the roof of the vehicle. Thereafter, by stacking the second battery case 102 and inserting the engaging member 300 into a hollow into which the engaging member 300 has not been inserted, the second battery case 102 may be coupled to the roof of the vehicle.

In this case, the engaging member 300 for coupling the first battery case 101 to the roof of the vehicle and the engaging member 300 for coupling the second battery case 102 to the roof of the vehicle may have different lengths, and the engaging member 300 may include a first engaging member 310 having a relatively short length and a second engaging member 320 having a relatively long length.

That is, the first engaging member 310 may be an engaging member for engaging the first battery case 101 to the roof of the vehicle and the second engaging member 320 may be an engaging member for engaging the second battery case 102 to the roof of the vehicle.

The stackable battery according to embodiments of the present invention is not limited to stacking of the two battery cases 100, such that according to the number of stacked battery cases 100, the length of the engaging member 300 may vary and the number of hollows of the mounting portion 250 formed may also vary.

Meanwhile, a rear member 400 extending in a width direction of the vehicle may be formed at a front side or a rear side of the battery case 100, and the mounting portion 450 having the plurality of hollows formed therein may be formed in the rear member 400.

In the rear member 400, like the side member 200, the mounting portion 450 having the hollows formed to mount the battery case 100 on the roof of the vehicle may be formed, and although it is shown that two rear members 400 are provided for one battery case 100 in the stackable battery according to an embodiment of the present invention, one rear member 400 may be provided by extending long or two or more rear members 400 may also be provided, without being limited thereto.

A seating surface 255 on which an upper end surface of the engaging member 300 is seated may be formed in an inner lower portion of the mounting portion 250 of the side member 200.

More specifically, referring to FIG. 5, the engaging member 300 may be a bolt, and the engaging member 300 may include an upper end surface having a greater width than that of the seating surface 255. The width of the hollow formed in the mounting portion 250 may be greater than that of an upper end surface (a bolt head for a bolt) of the engaging member 300 to facilitate insertion of the engaging member 300.

Moreover, to maintain insertion of the engaging member 300 and engagement of the battery case 100 stably, a seating surface 255 on which an upper end surface of the engaging member 300 is seated is formed on the inner lower portion of the mounting portion 250 and the upper end surface of the engaging member 300 is stably seated on the seating surface 255, thereby strengthening coupling between the battery case 100 and the roof of the vehicle.

While embodiments of the present invention have been shown and described in relation to specific embodiments thereof, it would be obvious to those of ordinary skill in the art that embodiments of the present invention can be variously improved and changed without departing from the spirit of the present invention provided by the following claims.

What is claimed is:

1. A stackable battery comprising:

a plurality of battery cases stacked in a height direction of a vehicle, each of the battery cases comprising:

a side member on an outer side of a respective battery case extending in a length direction of the vehicle; and a mounting portion comprising a plurality of hollows vertically extending through the side member, wherein the mounting portion of a bottommost battery case is configured to be engaged to a roof of the vehicle by inserting first engaging members into first hollows of the plurality of hollows and inserting second engaging members into second hollows of the plurality of hollows, wherein the second hollows are adjacent to the first hollows in the mounting portion, wherein the second engaging members have a longer length than the first engaging members, the second engaging members being longer by a distance corresponding to a height of a battery case, wherein each of the plurality of hollows comprises a seating surface in an inner lower portion, the seating surface configured to engage and to support an upper portion of a respective first engaging member or a respective second engaging member, wherein the first engaging members penetrate the plurality of hollows of the bottommost battery case and the upper portions of the first engaging members are seated on the seating surfaces of the bottommost battery case, and wherein the second engaging members penetrate the plurality of hollows of both the bottommost battery case and a second battery case stacked on the bottommost battery case such that the upper portions of the second engaging members are seated on the seating surfaces of the second battery case.

2. The stackable battery of claim 1, further comprising:

a rear member provided at a front side or a rear side of the battery case and extending in a width direction of the vehicle; and a second mounting portion comprising a third plurality of hollows vertically extending through the rear member.

3. The stackable battery of claim 1, further comprising:

a rear member provided at a rear side of the battery case and extending in a width direction of the vehicle; and a second mounting portion comprising a third plurality of hollows vertically extending through the rear member.

4. The stackable battery of claim 1, further comprising:

a rear member provided at a front side of the battery case and extending in a width direction of the vehicle; and a second mounting portion comprising a third plurality of hollows vertically extending through the rear member.

5. The stackable battery of claim 1, wherein the first engaging members and the second engaging members are inserted crosswise into the plurality of hollows provided in the mounting portion.

6. The stackable battery of claim 1, wherein the second battery case is configured to be stacked on the bottommost battery case and engaged to the roof of the vehicle after the bottommost battery case is disposed on the roof of the vehicle and engaged to the roof of the vehicle.

7. The stackable battery of claim 1, wherein the first and second engaging members are bolts.

8. The stackable battery of claim 1, wherein the side member and the mounting portion are a single unitary structure, and wherein the plurality of hollows of the mounting portion are arranged at regular intervals along the side member.

9. A stackable battery comprising:

a plurality of battery cases stacked in a height direction of a vehicle, the plurality of battery cases comprising a first battery case positioned in a lower portion of the stackable battery and a second battery case positioned in an upper portion of the stackable battery, each of the plurality of battery cases comprising:

a side member on an outer side of a respective battery case extending in a length direction of the vehicle;

a mounting portion comprising a plurality of hollows penetrating vertically in the side member; and seating surfaces provided in an inner lower portion of each of the plurality of hollows, the seating surfaces configured to engage and support an upper portion of each of first engaging members and second engaging members, wherein the mounting portion of the first battery case is configured to be engaged to a roof of the vehicle by inserting the first engaging members into first hollows of the plurality of hollows and by inserting the second engaging members into second hollows of the plurality of hollows, wherein the second hollows are adjacent to the first hollows in the mounting portion, wherein the second engaging members have a longer length than the first engaging members, the second engaging members being longer by a distance corresponding to a height of the battery case, wherein the first engaging members penetrate the first hollows of the first battery case and the upper portions of the first engaging members are seated on the seating surfaces of the first battery case, and wherein the second engaging members penetrate the plurality of hollows of both the first battery case and the second battery case such that the upper portions of the second engaging members are seated on the seating surfaces of the second battery case.

10. The stackable battery of claim 9, wherein the first engaging members and the second engaging members are inserted crosswise into the plurality of hollows provided in the mounting portion.

11. The stackable battery of claim 9, wherein the second battery case is configured to be stacked on the first battery case and engaged to the roof of the vehicle after the first battery case is disposed on the roof of the vehicle and engaged to the roof of the vehicle.

12. The stackable battery of claim 9, further comprising:

a rear member provided at a front side of the battery case and extending in a width direction of the vehicle; and a second mounting portion comprising a third plurality of hollows vertically extending through the rear member.

13. The stackable battery of claim 9, further comprising:

a rear member provided at a rear side of the battery case and extending in a width direction of the vehicle; and a second mounting portion comprising a third plurality of hollows vertically extending through the rear member.

14. The stackable battery of claim 9, wherein the first and second engaging members are bolts.

15. The stackable battery of claim 9, wherein the side member and the mounting portion are a single unitary structure, and wherein the plurality of hollows of the mounting portion are arranged at regular intervals along the side member.

16. A vehicle comprising:

a vehicle body comprising a roof;

a first battery case mounted directly on the roof and engaged to the roof by first engaging members; and a second battery case mounted on the first battery case in a height direction of the vehicle and engaged to the roof by second engaging members;

wherein each of the first battery case and the second battery case comprises:

a side member on an outer side thereof extending in a length direction of the vehicle;

a mounting portion comprising a plurality of hollows vertically in the side member; and seating surfaces provided in an inner lower portion of each of the plurality of hollows, the seating surfaces configured to engage and support an upper portion of each of the first engaging members and the second engaging members, wherein the second engaging members have a longer length than the first engaging members, the second engaging members being longer by a distance corresponding to a height of the first battery case, wherein the first engaging members penetrate first hollows of the plurality of hollows provided in the mounting portion of the first battery case and the upper portions of the first engaging members are seated on the seating surfaces of the first battery case, wherein the second engaging members penetrate first hollows of the plurality of hollows provided in the mounting portion of the second battery case and penetrate second hollows of the plurality of hollows provided in the mounting portion of the first battery case such that the upper portions of the second engaging members are seated on the seating surfaces of the second battery case, and wherein the second hollows of the plurality of hollows provided in the mounting portion of the first battery case are adjacent to the first hollows of the plurality of hollows provided in the mounting portion of the first battery case.

17. The vehicle of claim 16, wherein each of the first battery case and the second battery case further comprises:

a rear member provided at a front side or a rear side of the battery case and extending in a width direction of the vehicle; and a second mounting portion comprising a third plurality of hollows vertically extending through the rear member.

18. The vehicle of claim 16, wherein the first engaging members and the second engaging members are inserted crosswise into the plurality of hollows provided in the mounting portion of the first battery case.

19. The vehicle of claim 16, wherein the second battery case is stacked on the first battery case and engaged to the roof of the vehicle by the second engaging members after the first battery case is disposed on the roof of the vehicle and engaged to the roof of the vehicle by the first engaging members.

20. The vehicle of claim 16, wherein the side member and the mounting portion are a single unitary structure, and wherein the plurality of hollows of the mounting portion are arranged at regular intervals along the side member.

* * * * *